United States Patent Office 3,230,055
Patented Jan. 18, 1966

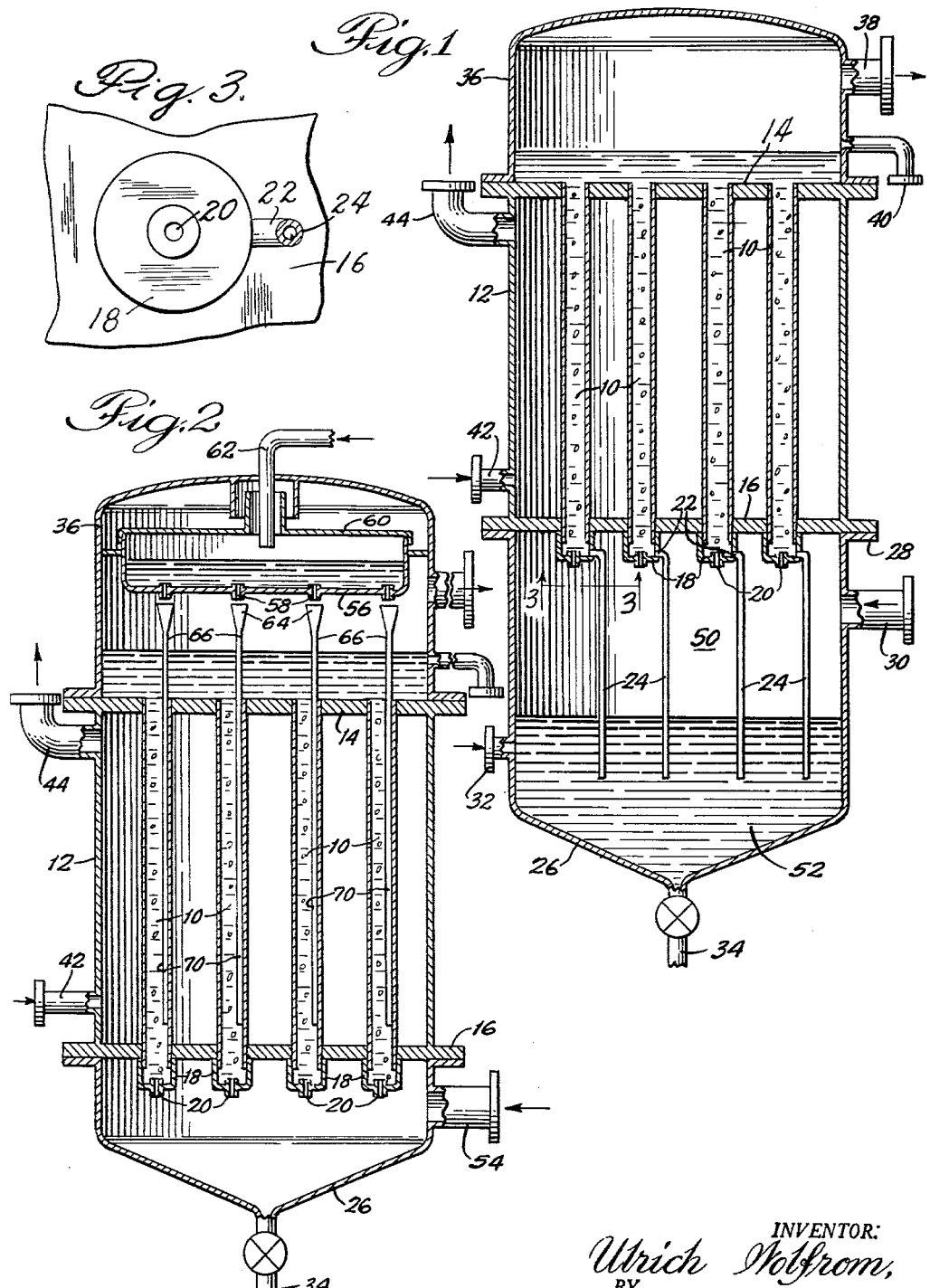

1

3,230,055
APPARATUS FOR CONTACTING LIQUID
AND GASEOUS REACTANTS
Ulrich Wolfrom, Planegg, Upper Bavaria, Germany,
assignor to Hans J. Zimmer, Frankfurt am Main,
Germany
Filed Dec. 6, 1960, Ser. No. 74,163
2 Claims. (Cl. 23—285)

This invention relates to an apparatus and method for continuously contacting a gas and a liquid in predetermined proportions. The invention finds particular use in carrying out liquid-gas phase chemical reactions, especially in the presence of a catalyst.

Generally such reactions are carried out by premixing the reactants and then passing them through a plurality of elongated reaction tubes which may contain solid catalyst. The tubes may be externally heated or cooled depending upon whether the reaction is endothermic or exothermic. The flow through the tubes is generally from the top to the bottom with liquid flow being controlled by restricted holes or narrow longitudinal slits in the upper ends of the tube, and the uniform distribution of the gaseous reactant being effected by the resistance within the tube due to the presence of the solid catalyst filling.

This known procedure is practical if the reaction takes place rapidly. Where the reaction periods are comparatively long, the liquid flows through the tubes too quickly and the reaction is, therefore, incomplete. When the flow is reversed so that it proceeds against gravity the interstitial space between the catalyst particles becomes filled with liquid and the gas bubbles up through the liquid. Such a reverse flow procedure has been practiced heretofore only in a single tube of relatively large diameter. The reaction temperature within a large diameter tube is difficult to control although there is little difficulty in proportioning the reactants, since they all go into a single tube.

In accordance with the present invention slow reactions between gases or vapors and liquids can be carried out continuously against gravity in a multitube reactor. The gaseous and liquid reactants are proportioned uniformly into each of the individual reaction tubes so that the reaction product issuing from all the tubes is uniform. The distribution of equal volumes of liquids and gas to the inlet in each reaction tube is achieved by passing the gas from a common pressurized source into the tubes through a restricted orifice such as a nozzle, perforated plate, or the like, in the ends thereof. The restricted orifice has a throttling effect which produces a pressure drop so that the pressure within the lower end of the tube is reduced below that of the gas outside of the tube. The liquid reactant is simultaneously introduced to each tube from a common source into this reduced pressure space at the lower end of each of the tubes. This construction may be likened to a perforated plate or sieve bottom, similar to those used in distillation columns. In the present case the liquid head is much greater than in a perforated plate in a distilling column, since the liquid extends throughout and above the top of the tubes. Also the gas pressures employed must be different because the tubes are individual and separate the head into individual columns.

For regulated operation of a perforated plate it is necessary to produce a throttling effect across the perforations in order to achieve accurate continuous proportioning of the gas. If the pressure of the gas upstream of the perforation or restricted orifice is too small, the liquid above the plate will break through which interrupts the normal function of the plate.

In the present invention the pressure drop across the restricted orifice at the lower end of each tube is fixed at a value that will prevent flow of the liquid through the orifice. The reduction of pressure across the orifice to a value approximately one-half of the pressure due to the entire hydrostatic liquid head has been found to be suitable. If the volume of gas in any one tube is less than in the other tubes, the weight of liquid in the tube or the hydrostatic head will proportionately increase. This causes the pressure in the liquid space just downstream of the orifice to increase simultaneously and reduce proportionately the pressure drop across the orifice. Consequently, the volume of gas flowing into the tube through the orifice is further reduced and ultimately the condition for a breakthrough of the liquid will arise. By fixing the pressure drop at a sufficiently high value (such as indicated above) a stable equilibrium condition is established under which the volume of gas flowing into the tube is constant. Thus every tube receives exactly the same volume of gas.

The reduced pressure within the lower end of each tube due to the gas flow through the restricted orifice permits introduction of the liquid reactant to each tube at the same rate. In a preferred form of the invention a liquid feed tube or suction tube leads from the space of reduced pressure in the lower end of each tube to a source of the liquid reactant within the gas pressurized space. The liquid is sucked through the tube due to the pressure differential. Because the pressure differential at each tube is the same, the volume of liquid introduced is constant.

The preferred form for practicing my invention is shown in FIGURE 1, which is a vertical sectional view showing the reactant tubes and the surrounding vessel. The liquid is sucked into these tubes. FIGURE 2 is a similar view showing an alternative form of apparatus in which the liquid is introduced into the reactant tubes from above by gravity. FIGURE 3 is a partial sectional view taken on line 3—3 of FIGURE 1.

Referring to FIGURE 1, a plurality of reaction tubes 10 are uniformly spaced within a cylindrical vessel 12 by means of upper bulkhead 14 and a lower bulkhead 16 to which the tubes are welded. The tubes pass through the bulkhead and are open at the top. The lower ends of the tubes are closed with caps 18 containing a restricted orifice 20 in the bottom thereof and openings 22 in the side thereof. The latter openings connect to liquid feed tubes 24. The lower end of the vessel 12 including the tubes 24 is enclosed with a large bottom cap 26 which is welded or bolted to the bulkhead 16 by means of the flange 28. A gas inlet tube 30 is disposed within the cap 26 at a point below the flange 28. A liquid inlet tube 32 is disposed in the side wall of the cap 26 at a point below the tube 30. These tubes supply gaseous and liquid reactants to the reaction tubes. A valve drain may be provided in the bottom of the lower cap 26.

Likewise a top cap 36 encloses the top of the vessel 12 and is welded to the upper bulkhead 14 by means of a flange. The upper cap carries a gas outlet fitting 38 and a liquid outlet fitting 40 set below the gas outlet fitting.

The space surrounding the reaction tubes 10 may be heated or cooled by passing fluid of the appropriate temperature through inlet fitting 42 and out the outlet 44. Where the reaction is endothermic, heat may be supplied from hot gas flowing around the tubes. If desired the tubes may contain a catalyst. It will be appreciated that since the tubes are of relatively small diameter, heat may be conducted readily to the liquid and gas flowing therethrough and to the catalyst therein. Likewise, if the reaction is exothermic, cooling fluid may be passed around the tubes to take away the heat of reaction and keep the reactants passing through the tubes 10 at the desired temperature.

The reactant gas is introduced into the cap 26 at the connection 30 under pressure. The liquid reactant is introduced through the fitting 32 at a rate sufficient to supply liquid as fast as it is advanced through the apparatus. The gas goes into the space 50 and flows into each one of the tiny orifices 20 in the bottom of the reaction tubes 10. The pressure on the downstream side of the orifice 20 is reduced by reason of the throttling effect. The reactant liquid is sucked from the pool 52 in the bottom of the cap 26 through feed tubes 24 which are all of the same length so that they dip down into the liquid an equal depth at all times. Because of the differential pressure within the space 50 and the lower end of the tube downstream of the opening 22, liquid is sucked into the end of the reaction tube 10. Both the gaseous (or vapor) reactant and the liquid reactant rise through the tubes 10 as fresh liquid and gas are supplied to the lower ends thereof. The reaction products are removed from the top of the vessel through the liquid outlet 40 or the gas outlet 38, according to the state of the product. Since all the orifices 20 are exposed to a common source of pressurized gas in the space 50, the flow is uniform. Likewise the pressure differential between the liquid body 52 and the interior of tube 10 is constant in each tube so that the liquid flow is uniform. Any drop in pressure across the liquid opening 22 must be smaller than the drop across the orifice 20. Otherwise the liquid level will flow to the height of the nozzles 20 which must not occur. The feed or suction tubes 24 are of smaller diameter than the opening 20, as shown on FIGURE 3. Thus the quantity of liquid and gas fed to each tube is the same in spite of variations in the flow of gas and/or liquid through the fitttings 30, 32.

The apparatus shown in FIGURE 2 is the same as that shown in FIGURE 1 except for the means for feeding liquid to the reaction tubes 10. A reservoir 56 is mounted in the top cap 36 above the reaction tubes. An orifice 58 is provided in the bottom of the reservoir for each of the reaction tubes. A feed tube 66 which may be disposed within the reaction tube terminates at its upper end in a funnel 64 and at its lower end at a point designated by the numeral 70 near the lower end of the reaction tube. A cover 60 is provided to enclose the reservoir 56. Liquid is fed into the reservoir through the supply tube 62. The flow of liquid into the feed tube 66 is controlled by the size of the orifices 58 in the bottom of the reservoir. The liquid flows out of the end 70 of the feed tube and there enters tube 10 and mixes with gas flowing through the orifice 20. It will be appreciated that the flow of liquid to each tube is uniform since the head at each orifice 58 is the same. The apparatus shown in FIGURE 2 is of shorter dimensions than that shown in FIGURE 1 and may be used where space requirements dictate a limitation on height.

The pressure within the vessel below the tubes is not critical since the process does not depend upon the absolute pressure at which the reaction occurs but rather upon the difference in pressure required for uniform proportioning of both phases. Of course, the gaseous pressure must be greater than the minimum required to hold the liquid in the reaction tube against gravity, as pointed out above.

What is claimed is:
1. Apparatus for continuously contacting a gas and a liquid in predetermined proportions comprising a vessel containing a plurality of substantially vertical open ended reaction tubes, a pair of spaced bulkheads through which the opposite ends of the tubes extend for supporting said tubes and for dividing said vessel into an upper, an intermediate, and a lower chamber, closure means for the lower ends of each said tubes containing a restricted orifice through which the interior of said tubes communicates with said lower chamber, means for introducing said gas under pressure into said lower chamber for flow through said restricted orifices into said reaction tubes, reservoir means in said upper chamber for holding liquid, said reservoir means having a plurality of orifices in its bottom for dispensing liquid at a uniform rate, a plurality of feed tubes for introducing said liquid into the lower ends of said reaction tubes immediately downstream of the orifice of said closure means at a uniform rate of flow to maintain said tubes filled with liquid, said feed tubes terminating at their upper ends in said upper chamber and beneath the orifices of said reservoir, the orifice of said closure means effecting reduction of pressure of said gas to about one-half the pressure due to the hydrostatic head of said tubes when filled with liquid, and an outlet means in said vessel for discharging liquid flowing into said upper chamber from the upper ends of said tubes.

2. Apparatus for continuously contacting a gas and a liquid in predetermined proportions comprising a vessel containing a plurality of substantially vertical reaction tubes, a pair of spaced bulkheads through which the opposite ends of said tubes extend for supporting said tubes and for dividing said vessel into an upper, an intermediate and a lower chamber, the upper ends of said tubes opening into said upper chamber, closure members for the lower ends of each said tubes containing a restricted orifice through which the interior of each said tubes communicates with said lower chamber, means for introducing said gas under pressure into said lower chamber for flow through said restricted orifice into said reaction tubes, means for introducing liquid into said lower chamber, a liquid feed tube of small cross section connecting at one end to the lower ends of said reaction tubes immediately downstream of said orifice and at the other end to a pool of liquid in the bottom of said lower chamber, said tubes being maintained full of liquid by the relative restrictions of the restricted orifice and liquid feed tube respectively, said orifice effecting reduction of pressure of said gas to about one-half the pressure due to the hydrostatic head of said tubes when filled with liquid, and outlet means in said vessel for discharging liquid flowing into said upper chamber from the upper ends of said tubes.

References Cited by the Examiner
UNITED STATES PATENTS

| 1,181,205 | 5/1916 | Arnold | 23—285 |
| 2,519,618 | 8/1950 | Wilson et al. | 261—152 |
| 2,532,756 | 12/1950 | Brunjes et al. | |
| 2,762,683 | 9/1956 | Massey | 23—1 |
| 2,917,372 | 12/1959 | Wallin | 23—285 |
| 2,937,923 | 5/1960 | Shapleigh | 23—1 |

FOREIGN PATENTS

| 1,175,291 | 11/1958 | France. |
| 1,194,893 | 5/1959 | France. |

MORRIS O. WOLK, *Primary Examiner.*

MAURICE A. BRINDISI, *Examiner.*